April 4, 1961 F. J. CARSON ET AL 2,977,720
APPARATUS FOR BENDING GLASS SHEETS
Filed Dec. 27, 1956 6 Sheets-Sheet 1
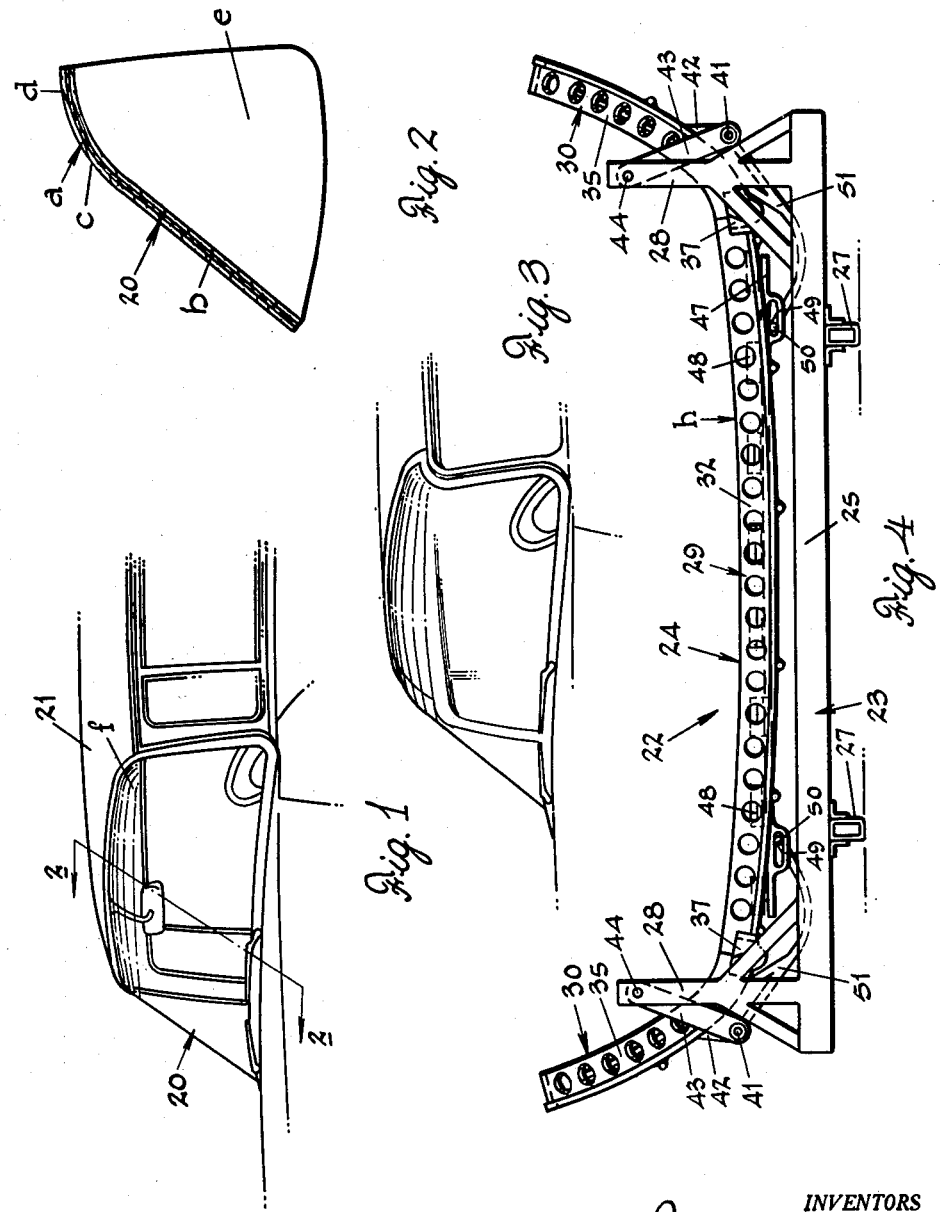
INVENTORS
Frank J. Carson and
BY Herbert A. Leflet, Jr.
Nobbe & Swope
ATTORNEYS

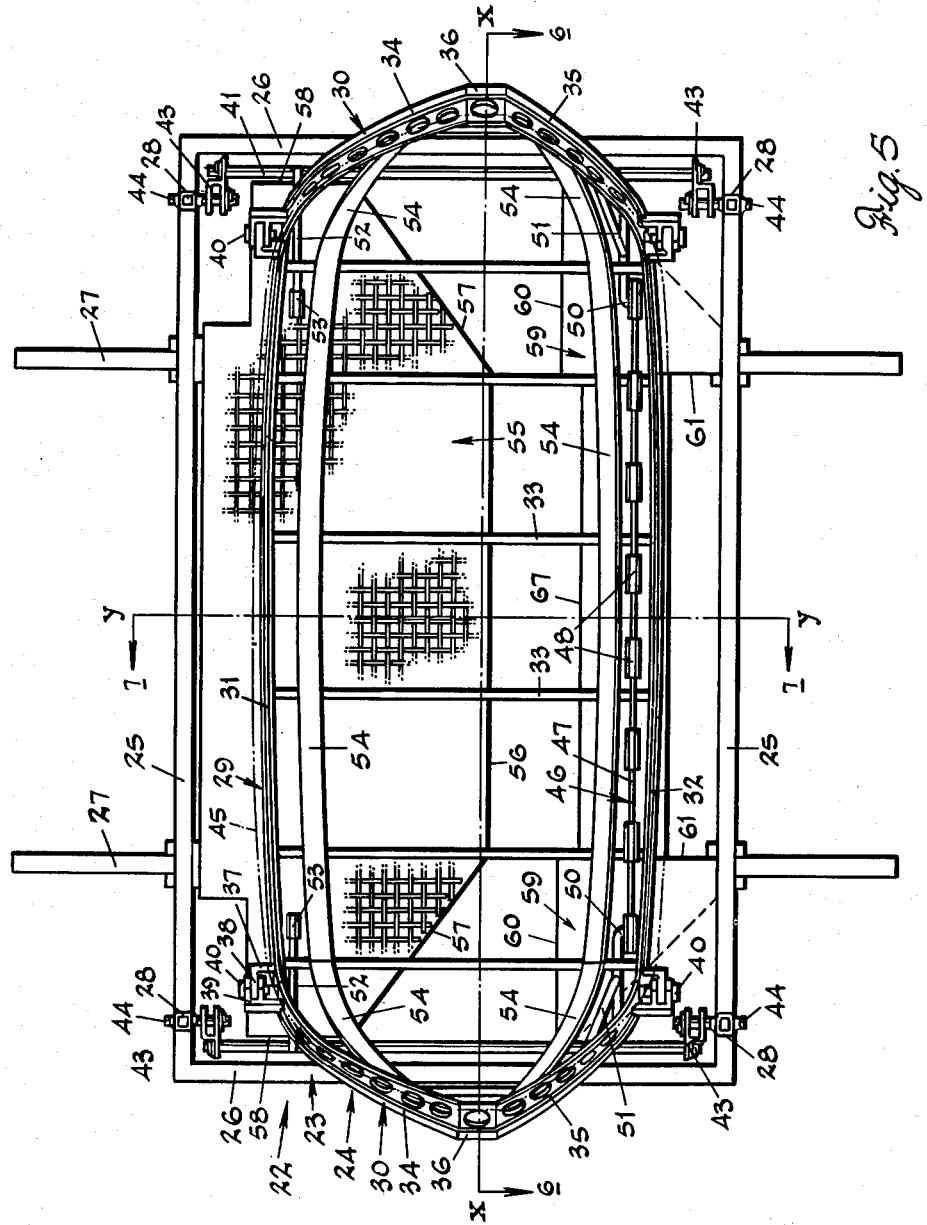

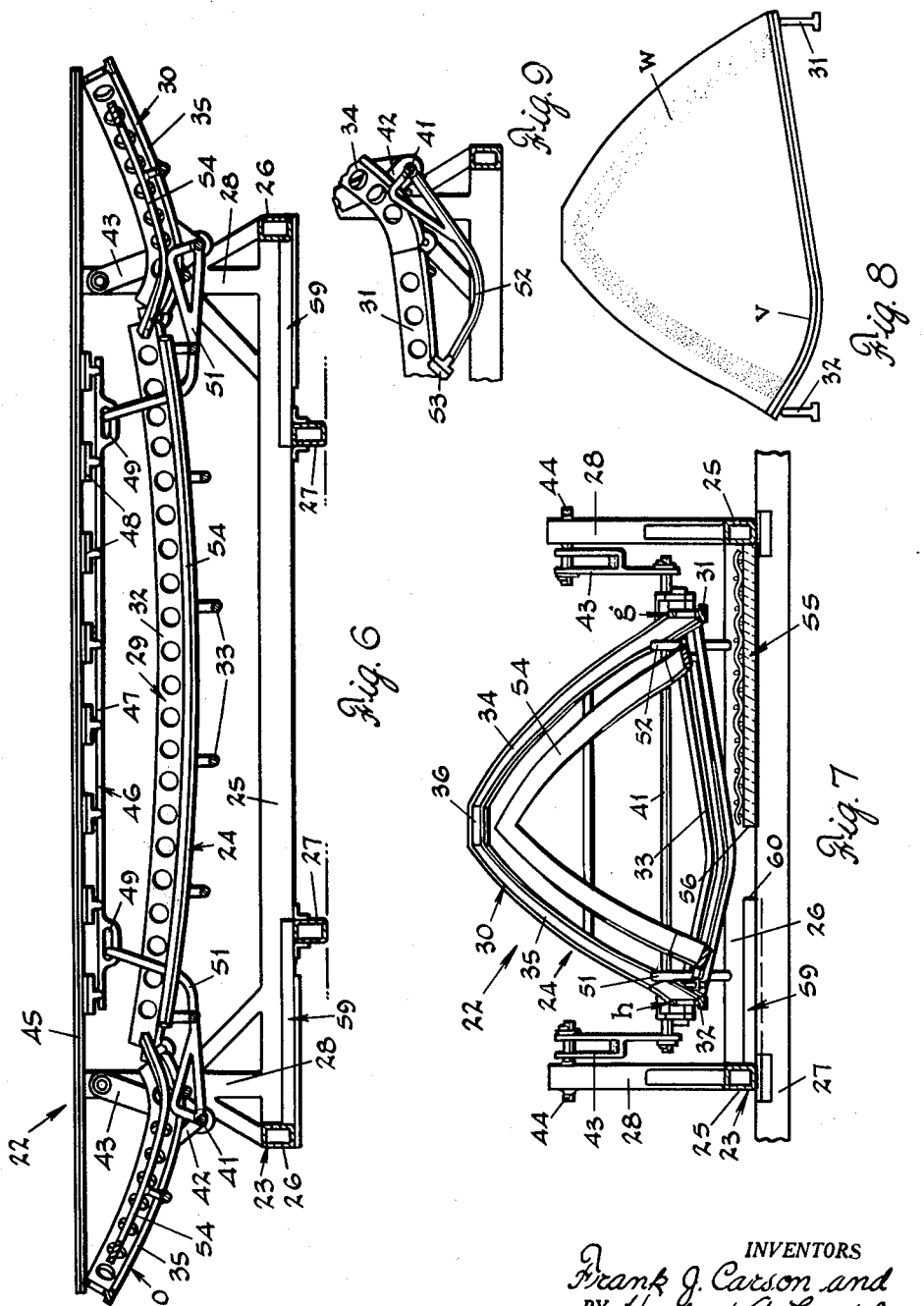

April 4, 1961 F. J. CARSON ET AL 2,977,720
APPARATUS FOR BENDING GLASS SHEETS
Filed Dec. 27, 1956 6 Sheets-Sheet 4
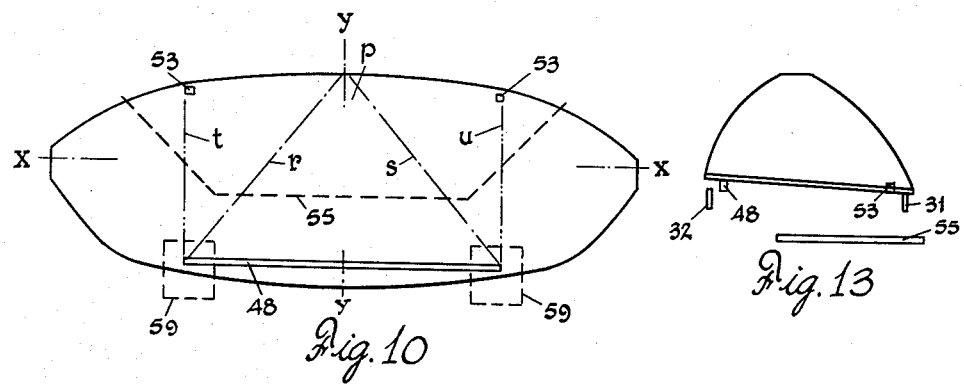
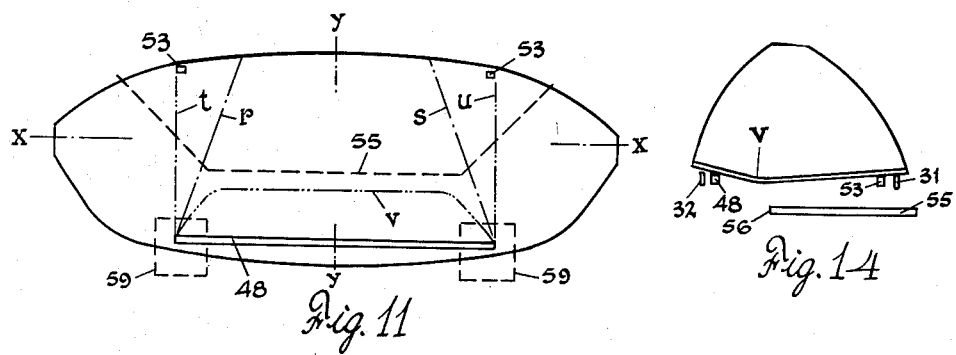
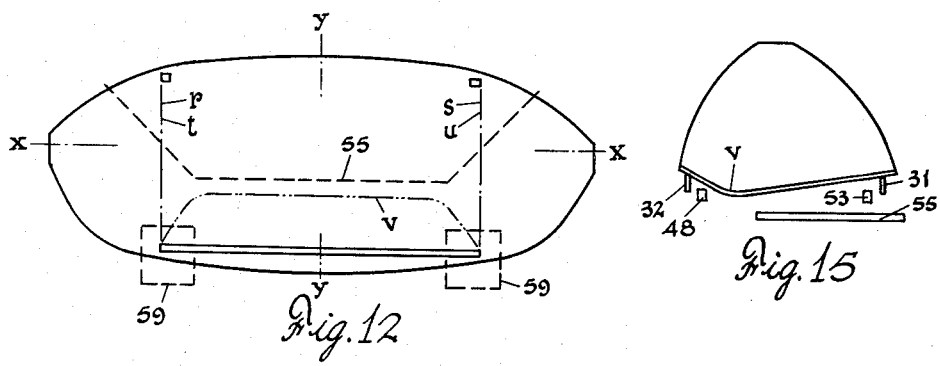
INVENTORS
Frank J. Carson and
BY Herbert A. Leflet, Jr.
Nobbe & Swope
ATTORNEYS April 4, 1961 F. J. CARSON ET AL 2,977,720
APPARATUS FOR BENDING GLASS SHEETS
Filed Dec. 27, 1956 6 Sheets-Sheet 5

INVENTORS
Frank J. Carson and
BY Herbert A. Leflet, Jr.
Nobbe & Swope
ATTORNEYS

April 4, 1961  F. J. CARSON ET AL  2,977,720
APPARATUS FOR BENDING GLASS SHEETS
Filed Dec. 27, 1956  6 Sheets-Sheet 6

INVENTORS
Frank J. Carson and
BY Herbert A. Leflet, Jr.
Nobbe & Swope
ATTORNEYS

United States Patent Office 2,977,720
Patented Apr. 4, 1961

2,977,720

APPARATUS FOR BENDING GLASS SHEETS

Frank J. Carson and Herbert A. Leflet, Jr., Toledo, Ohio, assignors to Libbey-Owens-Ford Glass Company, Toledo, Ohio, a corporation of Ohio Filed Dec. 27, 1956, Ser. No. 630,799

7 Claims. (Cl. 49—67)

The present invention relates generally to the bending of glass sheets or plates, and more particularly to an improved apparatus for bending glass sheets to complexly curved shapes.

This application is a continuation-in-part of our copending application Serial No. 574,329, filed March 27, 1956, now Patent No. 2,893,170 issued July 7, 1959.

In our prior filed co-pending application Serial No. 527,725, now abandoned, there is disclosed a method and apparatus for bending a glass sheet to a complex curvature including a bend about both the longitudinal and transverse axes of the sheet. Such bends are required in order to form a glass sheet, or pair of sheets, to the curvature desired in the so-called "cap" windshield, which may be defined as a windshield bent along its longitudinal axis and also curved along its transverse axis so that the upper portion thereof is arched or curved rearwardly and merges into the roof line of the automobile. In our above-mentioned copending application, to which reference may be made for a more complete understanding of the present invention, use is made of a plurality of molds to properly form bends of this type. Such a method and apparatus involving the use of two more molds proved to be both time consuming and expensive in operation.

Therefore, an important object of the present invention is to provide an improved apparatus for bending glass sheets to complexly curved shapes.

Another object of the invention is to provide an improved apparatus for forming bends about both the transverse and longitudinal axes of a glass sheet.

Another object of the invention is to provide an apparatus for bending glass sheets wherein the sheet is initially bent about both major axes thereof prior to being deposited upon a bending mold whereon the remaining degree of bending is effected.

Another object of the invention is to provide a heat absorbing member associated with a glass bending mold and adapted to retard the heating of selected portions of a glass sheet being bent.

Another object of the invention is to provide a composite heat absorbing member in which one portion of the member has good heat absorbing properties and another portion of the member provides an obstacle to the passage of air currents within a bending furnace.

A further object of the invention is to provide an apparatus for heating a glass sheet which is to be bent about both major axes thereof.

A still further object of the invention is to provide a bending mold having improved glass sheet supporting means which are adapted to lower the sheet to be bent into contact with the shaping surface of the mold.

Other objects and advantages of the invention will become more apparent during the course of the following description when taken in connection with the accompanying drawings.

In the drawings, wherein like numerals are employed to designate like parts throughout the same:

Fig. 1 is a perspective view of a cap windshield installed in an automobile;

Fig. 2 is a transverse sectional view of the windshield taken along the line 2—2 of Fig. 1;

Fig. 3 is a perspective view of another type of cap windshield;

Fig. 4 is a side elevation view of an improved bending mold constructed in accordance with the invention and shown in its closed position;

Fig. 5 is a plan view of the bending mold shown in Fig. 3;

Fig. 6 is a longitudinal section taken along the line 6—6 of Fig. 5 and showing the mold in the open position with a pair of glass sheets to be bent supported thereon;

Fig. 7 is a transverse section taken along the line 7—7 of Fig. 5;

Fig. 8 is a transverse sectional view of a pair of glass sheets bent in accordance with the method and apparatus of the invention with the phantom lines showing the sheet immediately after being deposited on the mold and the full lines portraying the sheet after final bending is completed;

Fig. 9 is a fragmentary side elevation showing a part of the glass sheet support means;

Figs. 10, 11 and 12 are plan views of the glass sheets to be bent while passing through various stages of the bending procedure;

Figs. 13, 14 and 15 are sectional views taken along the transverse center line of the sheets shown in Figs. 10, 11 and 12 respectively;

Figure 16:
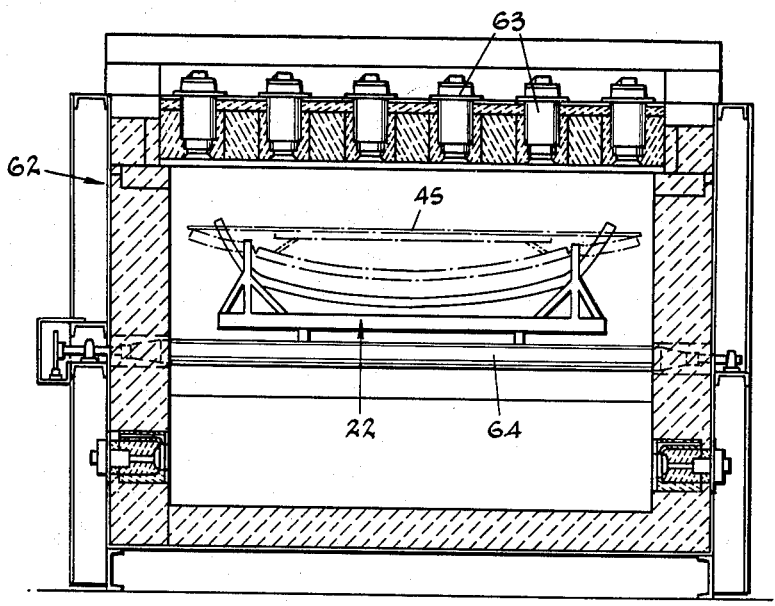
Fig. 16 is a sectional view of a furnace in which glass sheets may be bent in accordance with the method of the invention.

Briefly stated, the present invention provides an improved apparatus for bending glass sheets about both the longitudinal and transverse axes thereof, wherein a flat sheet, or pair of sheets, to be bent is first supported in a substantially horizontal plane above the shaping surface of a concave mold and heated to bending temperature in a suitable furnace. After reaching bending temperature, a section of one longitudinal edge area of the sheet is bent into contact with the mold shaping surface while the opposite edge area is maintained above the mold, and after the first marginal edge area has contacted the mold shaping surface the remainder of the sheet is bent into contact therewith.

With reference now to the drawings, Fig. 1 shows a cap windshield 20, which may be produced in accordance with the method and apparatus of the invention, when installed in an automobile 21. As shown in Fig. 1 and in sectional view in Fig. 2, the windshield 20 is of a general panoramic shape but has a swept-back cap portion *a* which extends rearwardly from the front surface *b* of the windshield through a curved portion *c* which, at its rearmost edge, is approximately flat to form a cap surface *d*. The cap surface *d* is substantially flat across the major portion of the windshield 20 and curves downwardly at each opposite end thereof to meet the wing portion *e* of the windshield. It will be readily understood by those familiar with the art, that the bending of glass sheets to such a curvature, especially in the upper end areas *f* (Fig. 1) of the windshield 20, is extremely difficult.

There is shown in Figs. 4 to 7 an improved bending apparatus 22 including a mold of the concave, hinged type which has been constructed in accordance with the present invention and which may be used to form a glass sheet, or pair of sheets, to the complex curvatures required by cap windshields. The bending apparatus 22 comprises a supporting rack 23 and a bending mold 24 carried thereby. The rack 23 is substantially rectangular in shape and comprises spaced longitudinal side rails 25 rigidly connected to one another at their opposite ends by end rails 26. As a means of guiding the rack through the glass bending furnaces commonly used, a pair of transversely spaced guide rails 27 are secured to the underside of the side rails 25 and may be received within guide flanges associated with the conveyor rolls used in most bending furnaces. To support the mold 24 above the rack 23, an upright 28 is spaced slightly inwardly from each of the opposite ends of the side rails 25 and rigidly secured to the upper surface thereof.

The mold 24 is of the general type commonly termed an outline or skeleton mold and comprises a movable center section 29 and opposite end sections 30 movably connected at their inner ends to the center section. As best seen in Figs. 5 and 7, the mold center section 29 comprises spaced side rails 31 and 32 formed by inverted T sections and having their upper surfaces g and h finished to form a shaping surface adapted to receive and form a glass sheet when bent into contact therewith. In plan view, each of the side rail sections 31 and 32 are bowed inwardly to a relatively slight degree of curvature and are rigidly joined to one another by a plurality of bent tie rods 33.

As shown in Fig. 7, the upper surface g of the rail section 31 is substantially flat in cross-sectional view while, for a purpose to be later described, the upper surface h of the opposite rail section 32 is convexly curved.

Each of the mold end sections 30 are substantially identical in shape and each comprises a pair of curved side rails 34 and 35, formed from inverted T sections, having their upper edges finished and joined together at their outermost ends by a relatively short and straight rail section 36. As shown in Figs. 5 and 7, the inner ends of the section side rails 34 and 35 are aligned with the adjacent ends of the center section side rails 31 and 32 and form, when the mold is in the closed position of Fig. 3, a substantially continuous curved shaping surface to properly shape the glass sheets to be bent.

To movably connect the mold end sections 30 to the center section 29, the opposite ends of each of the center section side rails 31 and 32 have an angle section 37 extending outwardly therefrom which has a longitudinally extending bar portion 38 thereof pivotally received within a yoke-like member 39 extending outwardly from the adjacent ends of the end section side rails 34 and 35. Suitable axially aligned holes are provided in the yoke and bar portions to receive a pin 40 which acts as a pivot member and completes the hinged joint.

The mold is supported for movement from an open position (Fig. 6) to a closed position (Fig. 4) by means of a transverse rod 41 rigidly secured to each of the mold end sections 30 by means of V-shaped members 42 depending from the rail sections 34 and 35. The opposite ends of the rods 41 extend outwardly beyond the rail sections 34 and 35 and each is rotatably secured in the lower end of a link 43 having its upper end swingably supported by means of a pin 44 secured in the upper end of the adjacent upright 28.

As will be later set forth in detail, one of the important features of the present invention is the particular manner in which the glass sheet to be bent is supported both prior to and during the bending thereof. To support a glass sheet 45, or a pair of sheets, there is provided glass sheet supporting means operatively connected to certain of the mold sections and which support the sheet while lowering the same into contact with the mold shaping surface in such a maner as to impart a transverse curvature to the sheet to be bent. As shown in Figs. 5 and 6, sheet supporting means designated in its entirety by the numeral 46 is positioned adjacent the center section rail 32 and spaced slightly inwardly therefrom to support one of the longitudinal marginal edge areas of the glass sheets. The support means 46 comprises a longitudinally disposed bar 47 having a series of relatively closely spaced sheet-receiving blocks 48 supported thereon along substantially the entire length thereof. Each of the blocks 48 is pivotally mounted on the bar 47 for rocking movement in a vertical plane which enables the block to properly conform to the undersurface of the lowermost of the glass sheets 45. At each of its opposite ends, the bar 47 has an oblong ring 49 formed therein through which is slidably received the end portion 50 of a bent arm 51 having its opposite end rigidly secured to the adjacent rotatably supported rod 41 which carries the mold.

As shown in Figs. 5 and 9, the opposite longitudinal edge areas of the glass sheets are supported at two spaced points, intermediate the ends thereof, by means of a pair of bent arms 52, similar to the arms 51, having sheet-contacting blocks 53, identical with the blocks 48, secured to their innermost ends and having their outermost ends rigidly secured to the adjacent rods 41. The blocks 53 are transversely aligned with the endmost blocks 48 carried by the rod 41 and, as will be later described in detail, during the closing action of the mold the arms 51 and 52 move in synchronous relationship with one another to properly support and lower the glass sheets to be bent onto the mold shaping surface.

It is oftentimes desirable that a peripheral compression band be formed in the glass sheets which are trimmed along said band and thus provided with a toughened edge. For this purpose, bar sections 54, contoured to the shape of the mold rail sections, are secured to the mold center and end sections and spaced inwardly from the adjacent rail sections. As is well known in the art, after the glass sheets are bent into contact with the mold shaping rail and annealed, the sheet portions between said rail and the bar sections 54 set in compression.

In order to obtain very accurate control of the degree of bend and the exact location of the points of bending in the glass sheets to be bent, it is desirable that the heating of certain portions of the sheets being bent is retarded with respect to other portions. In other words, the portions of the sheet to be bent to relatively sharp curvatures are heated to a higher temperature than other portions of the sheet not requiring relatively sharp bends. As a means of retarding the heating of portions of the sheet not requiring a sharp bend, a heat absorbing member 55 is positioned beneath the center section 29 of the mold and supported upon the members 27 forming a part of the rack 23. As best shown in Fig. 5, the member 55 is substantially trapezoidal in shape and extends inwardly beneath the rail 31 of the mold center section to a point somewhat beyond the longitudinal axis x—x of the glass sheets. The inner or leading edge 56 of the member 55 is substantially parallel with the side rails 31 and 32 of the mold center sections and terminates somewhat short of the ends thereof at diverging, rearwardly extending side edges 57. The side edges 57 extend rearwardly beyond the ends of the rail 31 and terminate in relatively straight edge sections 58. The member 55 may be formed of many heat absorbing substances and be of different forms of construction. It has been found that a grid-like construction of intersecting metallic rods or bars, supported upon a layer of Marinite (registered trademark), will give good results in terms of retarding the heating of the portions of the glass sheets disposed thereover.

"Marinite" is a registered trademark of the Johns-Manville Co. and is used by them to designate a specific lime silicate bonded porous refractory composition having over 50% silica and alumina, the other major ingredients of which are iron (as $Fe_2O_3$) and calcium oxide.

A representative analysis of Marinite is substantially as follows:

| | Percent |
|---|---|
| $SiO_2$ | 50.64 |
| Total iron (as $Fe_2O_2$) | 17.80 |
| $Al_2O_3$ | 6.28 |
| CaO | 10.77 |
| MgO | 4.86 |
| $Na_2O$ | 0.66 |
| $SO_3$ | 0.12 |
| Loss on ignition | 9.90 |
| Total | 101.03 |

To further control the heating of the glass sheets a pair of spaced, substantially rectangular heat absorbing members 59 are secured to the rack adjacent and beneath the ends of the center section rail 32. As shown in Fig. 5, the members 59 have their inner longitudinal edges 60 spaced from the inner longitudinal edge 56 of the member 55, and their transverse inner edges 61 substantially aligned with the intersection point of the leading edge 56 of the member 55 with the diagonal edges 57 thereof.

Although various types of bending furnaces may be used to heat the glass sheets to be bent, we prefer to use a furnace similar to that disclosed in the copending application of Gerald White and William P. Bamford, Serial No. 470,424. As shown in Fig. 16 this type of furnace 62 has a plurality of radiant type burners 63 mounted in the roof thereof which may be controlled to direct a selective and variable pattern of preformed beams of radiant heat downwardly at the path of bending molds as they pass through the furnace while being supported on the conveyor 64 thereof.

Figure 17:
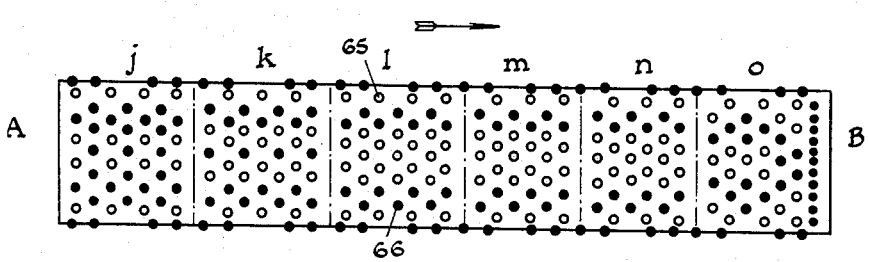
Fig. 17 is a plan view of the roof burner pattern used in the furnace shown in Fig. 16.

One of the important aspects of the present invention is the particular way in which heat is directed toward the glass sheets 45 to be bent while they are passed through the furnace 62. To illustrate this portion of the method of the invention, a diagram of the roof burners 63 is shown in Fig. 17 wherein the open circles 65 designate non-firing burners, or burners firing at a relatively low heat emission rate, and the solid circles 66 indicate burners firing at a greater heat emission rate. For purposes of subsequent description, the roof pattern shown in Fig. 17 is divided into six heating areas or zones which are designated by the letters j to o.

In bending a pair of glass sheets 45 by the method and apparatus of the invention, the mold sections are moved from the normally closed position of Fig. 4 to the open spread-apart position of Fig. 6. During such movement, wherein the links 43 swing outwardly, the arms 51 and 52, which are rigidly secured to the transverse rods 41, are rotated upwardly and inwardly due to the outward and downward rotation of the tips of the mold end sections 30 which imparts rotative movement to their respective support rods 41. When the mold sections are in the full open position, the upper surfaces of the glass supporting blocks 48 and 53 are in substantially the same horizontal plane as the upper edges of the rail sections 36 located at the tips of the mold end sections 30.

The pair of glass sheets, which are rough cut to pattern outline, is then placed upon the mold and the marginal end portions of the lowermost sheet are supported by the rail sections 36. When the sheet ends are thus supported, the one longitudinal sheet edge is supported substantially continuously along a substantial portion of its length, intermediate the supported ends thereof, by the plurality of support blocks 48, and the opposite longitudinal edge portion is supported at spaced-apart points by the blocks 53. The glass sheets, due to their rigid condition when cold, restrain the mold end sections from moving upwardly and thus maintain the mold sections in the open spread-apart position of Fig. 6.

After the sheets are positioned thereon, the mold is then passed into the entry end A (Fig. 17) of the furnace 62. Upon entering the furnace, the sheets are subjected to a relatively uniform concentration of heat from the roof burners in zone j in order to gradually raise the overall temperature thereof. At the same time, however, the portions of the sheets disposed above the heat-absorbing members 55 and 59 have the heating thereof retarded due to the absorption of heat by these members from the furnace atmosphere adjacent those portions of the sheet and also due to the fact that the members do not allow their corresponding sheet portions to completely "see" the relatively hotter furnace floor and thus absorb radiant heat therefrom.

As the mold passes through the furnace, the glass sheet is subjected to gradually increasing temperatures and the heat is selectively applied to predetermined areas thereof to properly control the bending of the glass sheets. Thus as shown in Fig. 17, after passing through the initial or preheat zone j of the furnace 62, the mold passes into and through successive furnace zones k to n wherein the heat is concentrated upon the sheets outwardly of the central portion and inwardly somewhat of the ends thereof and substantially along transverse sheet portions adjacent and above the mold hinges. The selective application of heat to these portions of the sheet, which are subjected to the severest bend, raises the temperature thereof to a point calculated to properly enable them to readily conform to the desired relatively sharp curvature of the corresponding portions of the mold. At the same time, however, the central portion of the sheets and the end extremities thereof, which are not required to assume relatively sharp curvatures, are not substantially affected by the heat concentrations at the points of maximum desired curvature.

The mold is retained within zones k and n for a time interval sufficient to raise the overall temperature of the sheets to bending temperature whereat the sheets soften and lose their rigid character. At this time, the mold end sections 30 which have a relatively constant tendency to return to the closed position, due to the weight of the center section, begin to rotate inwardly toward the closed position. In so doing, the tips of the mold end sections begin to move upwardly and inwardly upon moving axes of rotation defined by the swingably supported transverse rods 41. The mold center section begins to move downwardly, and the arms 51 and 52 rotate inwardly and downwardly thus lowering the glass sheets therewith while continuing to support the same upon the blocks 48 and 53.

As previously mentioned and as shown in Figs. 5 and 6, the blocks 48 support the one longitudinal edge of the lowermost glass sheet in the central portion and along a substantial portion of its length while the blocks 53 support the opposite longitudinal edge of the glass sheet at two relatively greatly spaced points equidistant from the transverse sheet center line y—y. Thus, as the sheet is lowered toward the mold shaping surface, the longitudinal sheet edge portion between the spaced blocks 53 begins to sag between said blocks while the opposite sheet edge engaged by the blocks 48 is supported substantially horizontal or flat and moves through a descending series of substantially horizontal planes of support prior to contacting the adjacent shaping rail 32.

As shown in Figs. 8 and 10 to 15, the effect of so supporting and lowering the hot sheets sags or deflects the sheet portion p midway between the blocks 53 into contact with its adjacent rail 31 prior to other sheet portions contacting their respective portions of the mold shaping surface.

Thus, during the closing action of the mold, the central portion of the sheet, as defined by the blocks 53 and the endmost blocks 48, is deflected or folded about a pair of transverely converging and intersecting fold lines r and s having their apex adjacent the sheet portion p that first contacts the rail section 31 and their bases terminating at the opposite marginal edge portion of the sheets substantially at the portion thereof being supported by the outermost blocks 48. Thus the central portion of the sheet is folded in triangular fashion since the fold lines $r$ and $s$ are of theoretical equal length and form two legs of an isosceles triangle, and the sheet portion $p$ is at the midpoint of the base of the triangle as defined by the row of blocks 48. In addition, since the blocks 48 and 53 are lowering the sheet during the closing action of the mold, the sheet ends are folded or bent upwardly about additional fold lines $t$ and $u$ which are substantially parallel to one another and to the transverse axis $y$—$y$ of the sheets and have their ends terminating at the endmost blocks 48 and the blocks 53 transversely spaced therefrom.

As the mold continues the closing movement, the sheet edge areas on either side of the marginal portion $p$, initially contacting the shaping rail 31, contact said rail in a progressive outward movement so that the sheets continue to be folded along the fold lines $r$ and $s$ which, in effect, have their intersecting ends (Fig. 11) rotated outwardly while the location of their opposite ends remains relatively constant and determined by the outermost support blocks 48.

As shown in Fig. 14, a transverse bend in the sheet about the longiutdinal axis $x$—$x$ thereof begins to take place after the sheet portion $p$ has contacted the rail 31 since both the portion $p$ and the sheet portions opposite thereto are supported and the portions of the glass therebetween are at bending temperature. The line of transverse bending $v$ is positioned somewhat beyond the leading edge 56 of the member 55 since said member continues to absorb heat from the portion of the furnace atmosphere adjacent the undersurface of the glass sheets immediately thereabove and thus retards the heating of said portions.

As shown in Fig. 12, after the mold has reached the fully closed position, the formerly intersecting fold lines $r$ and $s$ have merged with the transverse fold lines $t$ and $u$ so that the sheet is substantially finally bent about the transverse axis $y$—$y$ thereof. At this time, the longitudinal fold line $v$, which develops due to the bending about the longitudinal axis $x$—$x$ of the sheets, has the opposite ends thereof curved outwardly toward the sheet edges above the rail 32. This is caused by the effect of the heat-absorbing members 59 which retard the heating of the portions of the glass sheets immediately thereabove and thus draw the line of folding or bending $v$ outwardly due to the flattening out of these portions of the sheets as a result of having the heating thereof retarded.

After the sheets have been bent into conformity with the mold shaping surface, the mold is passed into furnace zone $o$. In this zone, the sheet is heated in the central portion thereof while the sheet portions outwardly thereof are not subjected to additional heat. The heat concentration in the central portion of the sheet, in effect, is a continuation of bending heat which causes bending in only the central portions of the sheets to conform said portions to their final cap curvature as shown in Figs. 1 and 2.

In bending to the final curvature, the sheet edge (Fig. 8) supported on the rail 32, aided by the convexly curved shaping surface thereon, rotates upwardly somewhat while the portion of the sheet defining the line $v$ of maximum transverse bending is lowered. Since the heating of the portion of the sheets inwardly of the rail 31 is retarded by the member 55, most of the sheet bending in furnace zone $o$ takes place in sheet portions adjacent the rail 32. Of course, the length of time the mold is in zone $o$, as well as the other furnace zones, is carefully controlled so that the sheet will not bend excessively.

After leaving furnace zone $o$, the mold is passed through a suitable annealing furnace which may be a continuation of the furnace 62. In the annealing furnace, the temperature of the sheets is slowly lowered to approximately room temperature and the compression pattern $w$ (Fig. 8) is set. The sheets are then removed from the mold and cut to final pattern size along the outer edge of the compression band.

It is oftentimes desirable to vary the location of the heat-absorbing members and in some instances to add additional heat-absorbing members. For example, to maintain accurate positioning of the line $v$ of transverse curvature, an additional heat-absorbing member 67 (Fig. 5), of relatively narrow width, may be positioned beneath the rail 32. As explained in our prior filed application Serial No. 527,725, this aids in concentrating heat on the central sheet portions requiring maximum bending. Such heat concentrations are often necessary when bending glass sheets to the curvature required in producing cap windshields of the type shown in Fig. 3 wherein the curvature of the cap portions is more severe.

It was previously mentioned in connection with the composite member 55 shown in Fig. 7, that a grid like construction of intersecting metallic rods or bars adjacent and supported upon a layer of Marinite will give good results in terms of retarding the heating of the portions of the glass sheets disposed thereover. This is particularly the case when the grid comprises closely spaced metallic rods which will provide materially greater surface area available for absorbing heat as compared to a solid member of the same dimensions and also because Marinite, as well as also absorbing heat is substantially air impervious and thus block the upward flow of air currents which otherwise would pass through the metallic grid and provide additional heating of the glass sheets which in many instances is undesirable.

A further advantage obtained by the use of the composite heat absorbing member 55 is due to the fact that the metallic grid faces the undesurface of the glass sheets. Thus the area of the furnace from which the member 55 primarily absorbs heat lies between said member and the glass sheet. Furthermore, the passage of radiant heat from the glass sheets to the composite member is unobstructed and thus heat radiated from the glass sheets is absorbed.

Figure 18:
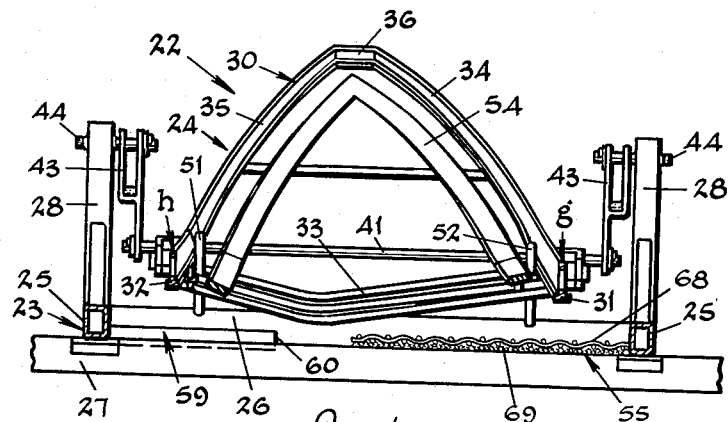
Fig. 18 is a transverse section similar to Fig. 7 and showing a modification of the invention.
Figure 19:
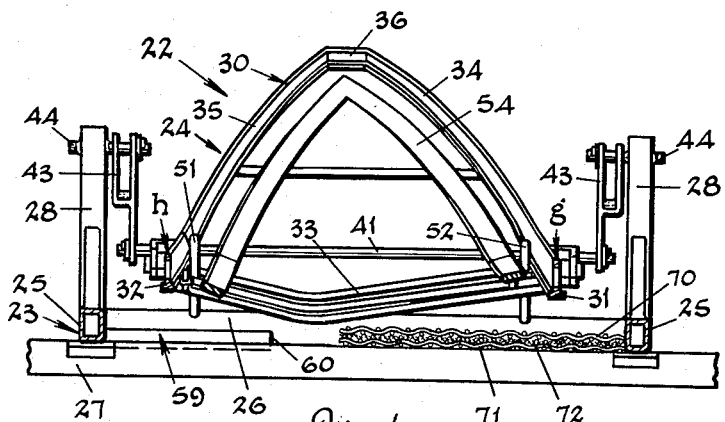
Fig. 19 is a transverse section similar to Fig. 18 and illustrating a further modification of the invention.

Other suitable composite heat absorbing members are shown in Figs. 18 and 19. With the embodiment shown in Fig. 18, the member 55 comprises a metallic grid 68 positioned above and in contact with a layer of relatively closely woven glass cloth 69 which cloth acts in the same manner as the layer of Marinite shown in Fig. 7 as far as providing an air block is concerned, but which, of course, will not absorb a significant amount of heat.

Fig. 19 shows a further modification of the invention in that the member 55 comprises a pair of metallic grids 70 and 71 having a layer of glass cloth 72 sandwiched therebetween. In this embodiment, the heat absorption capacity of the member is increased due to the fact that the lowermost grid 71 is provided which enables the composite member to absorb more heat from the furnace area beneath the mold than would be the case of the embodiment shown in Fig. 18.

A suitable metallic grid may be constructed from $\frac{1}{8}$ inch diameter steel rods spaced from one another both transversely and longitudinally at intervals of $\frac{3}{16}$ inch. With such a grid, an area thereof $\frac{3}{8}$ inch long and $\frac{3}{8}$ inch wide would have a surface area of approximately 0.88 square inch. This provides approximately three times as much surface area as compared to a portion of the same size from a solid metallic member which portion would have a surface area of approximately 0.28 square inch.

The composite member 55, shown in Figs. 7, 18 and 19 has previously been described as being trapezoidal in shape and located beneath the central portion of the mold shaping surface. However, this member may be of other shapes and located either above or below the mold central section or end sections and still prove highly effective as a heat absorber.

Although only Marinite and glass cloth have been disclosed in the drawings as materials to be associated with the metallic grid to provide a block to the upward flow of hot air against the glass sheets, it will be readily understood that most materials which are stable at temperatures above approximately 1200° F. may be used. For example, a layer of porous fire brick will work substantially as well as Marinite. Also, a thin layer of asbestos cloth would serve substantially the same purpose as a layer of glass cloth as far as providing an air block is concerned, the principle requisite of the material used, in addition to sustaining high temperatures, being that it is substantially impervious to the passage of air or, in other words, that it substantially obstruct or deflect the path of an upwardly directed air current even though the material itself is not air tight.

It is to be understod that the forms of the invention herewith shown and described are to be taken as preferred embodiments of the same, and various changes may be resorted to without departing from the spirit of the invention or the scope of the subjoined claims.

We claim:

1. In a glass bending mold adapted to bend a glass sheet in a hot atmosphere and comprising a shaping surface into conformity with which the glass sheet is to be bent, a composite heat absorbing member spaced from said shaping surface and positioned so as to face a surface of the glass sheet when supported on said shaping surface, said member comprising a metallic grid exposed to the atmosphere adjacent the glass sheet, and a layer of substantially air impervious material adjacent a surface of said grid.

2. A bending mold as claimed in claim 1, wherein the grid is positioned in contact with the air impervious material.

3. A bending mold as claimed in claim 2, wherein the composite heat absorbing member is positioned beneath the mold shaping surface.

4. A bending mold as claimed in claim 1, wherein the composite heat absorbing member includes a second metallic grid and the layer of air impervious material is interposed between the metallic grids.

5. A bending mold as claimed in claim 2, wherein the substantially air impervious material is a refractory material.

6. A bending mold as claimed in claim 2, wherein the substantially air impervious material is glass cloth.

7. A bending mold as claimed in claim 2, wherein the substantially air impervious material is asbestos cloth.

References Cited in the file of this patent

UNITED STATES PATENTS

| | | |
|---|---|---|
| 1,128,206 | Wiegard | Feb. 9, 1915 |
| 1,360,587 | Said | Nov. 30, 1920 |
| 2,179,635 | Kimmel | Nov. 14, 1939 |
| 2,348,278 | Boyles et al. | May 9, 1944 |
| 2,482,698 | Tillyer | Sept. 9, 1949 |
| 2,641,456 | Schmertz | June 9, 1953 |
| 2,697,679 | Zimarik | Dec. 21, 1954 |
| 2,720,729 | Rugg | Oct. 18, 1955 |